April 30, 1963  H. J. VARGA ET AL  3,088,031
ADJUSTABLE COLLIMATOR
Filed April 13, 1959

Inventors
Henry J. Varga
Arthur N. Haig
William P. Kirch
by W. S. Robertson
Attorney United States Patent Office 3,088,031
Patented Apr. 30, 1963

3,088,031
ADJUSTABLE COLLIMATOR
Henry J. Varga and Arthur N. Haig, Wauwatosa, and William P. Kirch, Milwaukee, Wis., assignors to Allis-Chalmers Manufacturing Company, Milwaukee, Wis.
Filed Apr. 13, 1959, Ser. No. 806,087
3 Claims. (Cl. 250—105)

This invention relates generally to a collimator for a high energy radiation source such as a betatron. More specifically this invention relates to a novel adjustable collimator which is very compact and which does not cause penumbra in the beam of radiation.

A betratron, like many other radiation sources, emits radiation in a beam that has a somewhat cone shaped pattern. Ordinarily it is desirable to be able to change the beam pattern to suit the particular subject being irradiated. For example, when high energy X-rays or gamma rays are used in radiation therapy, it is highly desirable to control both the size and the shape of the beam to prevent exposing the patient to unnecessary radiation. A collimator controls the beam pattern by simply blocking radiation that is outside the desired beam pattern. A collimator is thus somewhat analogous mechanically to the iris of a camera.

A collimator that is intended for radiation therapy should meet several general requirements. The collimator should be able to produce a variety of cross sectional shapes as well as a variable cross sectional size in order to meet the requirements of each application. Although a statistically determined number of rays will completely penetrate any collimator, a satisfactory collimator should have sufficient mass to absorb all but a very small percent of the undesired radiation. At the same time a collimator should be sufficiently compact to permit the radiation source to be placed within the customary distance of about 100 centimeters of the patient. Finally the collimator should define very sharply the boundaries between the selected pattern and the low level radiation outside the pattern and prevent a shadowy border that is called penumbra.

Penumbra is highly undesirable because any non-uniformity in the beam introduces an uncertainty into the problem of determining how much radiation the treatment area of a patient should receive. In fact a device called a filter is frequently provided with a radiation source to absorb as much as half of the strong central portion of the beam in order to compensate for the weaker outer portions of the beam. Massive collimators for high energy radiation may introduce penumbra into the beam. A collimator can cause penumbra if the collimator surfaces that face into the beam and define the aperture are not parallel with the immediately adjacent rays of the beam. Ideally, a flat aperture defining surface should lie in a plane that includes the focus of the radiation source so that the rays at the edge of the beam are parallel with the collimator and the rays immediately outside the beam encounter all of the collimating material.

Several adjustable collimators of the known prior art produce only very little penumbra. In one prior art collimator each side of a pyramid shaped beam is defined by a succession of blocks that are sufficiently thin that individually they produce no appreciable penumbra. The blocks along each side of the beam are movable at differing rates so that the inside edges of the blocks define a plane that includes the focus of the radiation source. In a somewhat similar collimator of the known prior art a succession of rectangular apertures are formed by two groups of intersecting thin L-shaped bars. The aperture size of this collimator is adjusted by moving the two groups of bars simultaneously on a common arc about the focus. The corners of the L-shaped groups are maintained in exact alignment with the focus of the beam and the legs of each L are maintained in approximate alignment with the focus.

Collimators having a succession of spaced bars are usually intended either for use with a source of soft X-rays that would tend to be reflected from a smooth, continuous aperture surface or they are used to increase the depth of the aperture in order to approximate a point focus with a radiation source such as cobalt 60 that has a large radiation emitting surface. With a radiation source such as a betatron that has a very small X-ray emitting surface, there is no need for a deep collimator aperture to approximate a point source. Furthermore, a betatron produces hard X-rays that are not readily reflected even from a smooth surface. On the other hand the X-rays from a betatron originate inside a magnetic field producing structure. The field producing structure is usually sufficiently large that a collimator for a betatron should be very compact in order to avoid an excessive distance between the focus and the patient. Consequently, prior art collimators for betatrons usually have only a single relatively deep absorbing element for each side of the beam. In the known prior art the adjustable collimators that have a single compact absorbing block for each side of the beam produce penumbra because adjusting the blocks to vary the aperture size disturbs the alignment of the aperture surfaces with the focus.

The collimator of this invention is very compact and produces a sharp definition of the boundaries of an X-ray beam and is particularly intended for use with a betatron. The collimator includes a number of radiation absorbing blocks that are arranged to form an aperture. The blocks are movable in arcs that are centered at the focus of the beam. In this way the surfaces of the blocks that face into the beam and define the aperture are properly aligned with the focus to prevent penumbra for any setting of the aperture.

An object of this invention is to provide a new and improved collimator.

Another object of this invention is to provide a new and improved adjustable collimator that does not produce penumbra.

Another object of this invention is to provide a new and improved adjustable collimator that is sufficiently compact for a radiation source such as a betatron.

Other objects and advantages will be apparent when the following description is read in connection with the following drawing in which.

Figure 2:
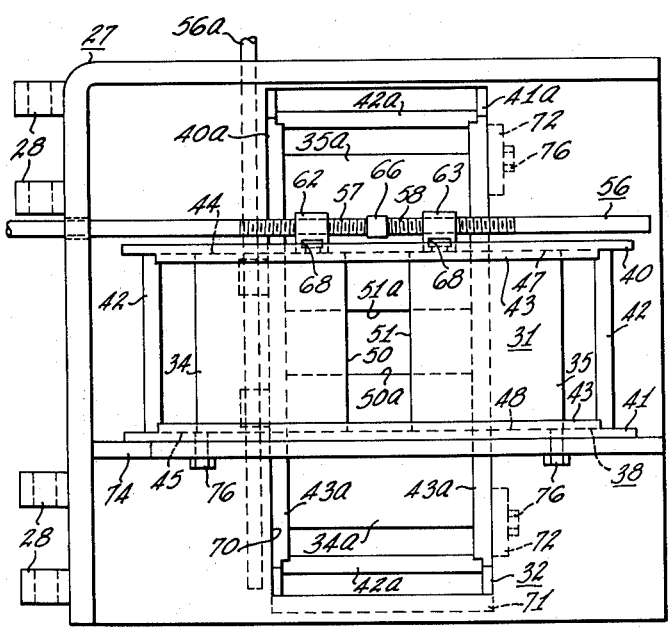
FIG. 2 is a back elevation of the collimator of this invention and a supporting frame.

The collimator of this invention may be used with a number of different radiation sources, but it is particularly intended to meet the requirements of a betatron. A typical betatron is shown in part in FIG. 1. An X-ray beam that is indicated by lines 11 originates inside a toroidal vacuum tube 12. The tube 12 is located within a magnetic structure 13 that causes electrons to accelerate in an orbit within the tube. The magnet structure 13 is substantially symmetrical about the plane of the drawing; and it includes, below the plane of the drawing, a circular steel pole piece 15, a flux producing coil 16 mounted on the pole piece, and a yoke 18 that connects the lower pole piece shown in the drawing in a magnetic circuit with a similar pole piece located above the tube. The yoke 18 is made of laminated steel and is mounted between a pair of end plates 20. Electrons are fired into the tube 12 by a suitable injector 22 and are accelerated by a changing magnetic field to a high energy, which for radiation therapy purposes is frequently on the order of 30 million electron volts. The high energy electrons are then directed to strike a metal target 23 from which the X-rays are emitted. The target 23 is on the order of .2 millimeter in diameter; and because of its small size, it can be considered to be the focus of the X-ray beam 11. The betatron has a suitable cover panel 27 that is mounted on one of the end plates 20 by means of hinges 28 to facilitate access to the tube for servicing. As is the frequent practice with collimators of the prior art, the collimator of this invention is mounted on the hinged cover panel 27 so that the collimator does not interfere with access to the tube.

The collimator of this invention causes the beam of radiation to have a pyramid shape with the apex of the pyramid at the focus of the source of radiation and with each side of the pyramid defined by a collimating block. The collimating blocks are preferably arranged in a number of sets each containing two blocks. The preferred collimator shown in the drawing has only two collimating sets 31 and 32. In the position of the betatron shown in FIG. 1, one set 31 is in a horizontal position and the other set 32 is in a vertical position. Of course, the betatron, like most radiation sources, can be adjusted to a number of different positions. The details of the two sets 31, 32 are similar and will be explained with reference to the horizontal set 31 that is shown in detail in FIGS. 2, 3 and 4. The horizontal set comprises two radiation absorbing blocks 34, 35, a track system 38 for guiding the blocks 34, 35 in an arcuate path about the focus 23 of the X-ray beam, and suitable means for positioning the two blocks in the track system. The track system comprises a pair of track plates 40, 41 that are spaced apart by dowel posts 42, and a group of arcuate rails 43 that are mounted on the two plates. Each block 34, 35 has two guide surfaces 44, 45 that slidingly engage the inner surfaces 47, 48 of the plates 40, 41 between the rails 43. In order to save space in the direction of the path of the beam, the rails 43 are recessed in cutouts in the blocks 34, 35. The rails 43 are curved on arcs of the proper radius so that the blocks 34, 35 are guided in an arcuate path that is centered at the focus 23 of the beam when the collimator is positioned on the betatron. The radiation that passes between the two blocks 34, 35 is bounded on one side by the aperture defining surface 50 of the block 34 and on the other side by the aperture defining surface 51 of the block 35. The aperture surfaces 50, 51 are each substantially flat and are at right angles to the direction of the blocks 34 or 35 as the blocks move along the arcuate path. As will be apparent when the operation of the collimator is explained, mounting the aperture surfaces at right angles to the path maintains the aperture surfaces in the proper alignment with the focus to prevent penumbra for any setting of the aperture spacing.

Preferably, as shown, the two track plates 40, 41 are parallel so that the narrow space between the inner surfaces 47 or 48 of the plates and the guide surfaces 44 or 45 of the blocks 34, 35 is at an angle to any X-ray in this region. The collimator thereby tends to prevent X-rays from leaking between these surfaces.

The inner side wall 53 and the outer side wall 54 of each block 34, 35 are preferably curved on an arc about the focus 23. Thus the amount of material that the collimator presents to rays outside the desired beam pattern is the same for any position of the blocks.

Figure 4:
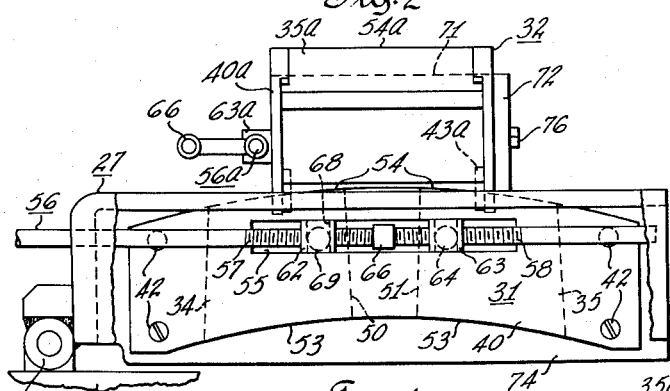
Figure 1:
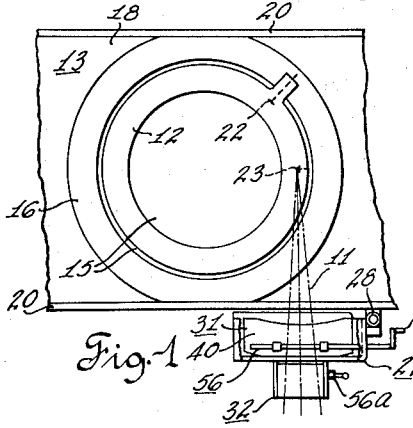
FIG. 1 is a top view section through a betatron illustrating the collimator of this invention.

Any suitable means may be used to position the two blocks 34, 35 in the track system 38 at the desired aperture spacing. Ordinarily the two blocks 34, 35 will be positioned an equal distance apart from the approximate center of the X-ray beam. The positioning means should be mounted so that it does not obstruct the aperture. As illustrated, the positioning means is mounted on the uppermost track plate 40 and connects to the blocks 34, 35 through a slot 55 in the track plate. Preferably the positioning means includes a shaft 56 having two oppositely threaded sections 57, 58, two threaded members 62, 63 that are mounted on the correspondingly threaded sections of the shaft and positioned in the slot 55, and a stud 64 mounted on each block 34, 35 and slidably connected to one of the threaded members. The two sections 57, 58 of the shaft 56 may be removably connected by suitable means 66 to facilitate mounting the members 62, 63 on the shaft. The shaft 56 is turned by any suitable means such as a reversible motor to drive the two threaded members 62, 63 oppositely in either direction in the slot 55. Preferably, as shown in FIGS. 1 and 4, the shaft is turned by means of a hand crank 66. The sliding connection between a stud 64 and a threaded member 62 or 63 is illustrated as a pair of grooves 68 in the members 62, 63 that receive a rim 69 of the stud. The studs 64 are narrower than the slot 55 so that the studs are free to slide in the grooves 68 somewhat crosswise of the slot 55 to allow for the variation between the arcuate path of the studs and the blocks 34, 35 in the track system 38 and the linear path of the threaded members 62, 63 in the slot.

The vertical collimating set 32 is similar to the horizontal set 31 just described and equivalent elements of the vertical set have the same numbers with the suffix A in the drawing.

The horizontal set 31 is preferably mounted nearer the focus 23 than the vertical set 32 because close spacing is possible between the circular coils 16 of the betatron and the horizontal set 31 because both are curved in the same plane. However, in applications others than a betatron the reverse mounting order may be preferable.

Because the horizontal set 31 is positioned nearer the focus 23 where the X-ray beam is somewhat smaller in cross section, all dimensions of the horizontal set that are measured perpendicular to the path of the X-ray beam may be somewhat smaller than for the outer vertical set.

Figure 3:
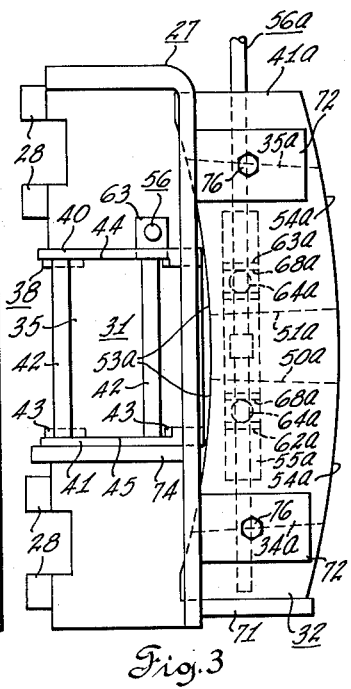
FIGS. 3 and 4 are respectively a side elevation and a top elevation of the collimator and the frame shown in FIG. 2.

The two collimating sets 31, 32 are mounted at the proper distance from the focus 23 with their arcs defining planes that are at right angles to each other. As is shown in FIGS. 2, 3 and 4, the hinged cover panel 27 is provided with a suitable opening 70 for receiving one of the sets, and the panel 27 forms part of a supporting frame for the collimator. The frame includes a supporting shelf 71 mounted on the cover panel 27 at the lower end of the opening 70 and two brackets 72 mounted along one side of the opening for mounting the vertical set 32. The frame also includes a shelf 74 mounted on the inner side of the panel for supporting the horizontal set 31. The two sets 31, 32 are accurately aligned on the shelves and are secured to the frame by bolts 76.

Figure 5:
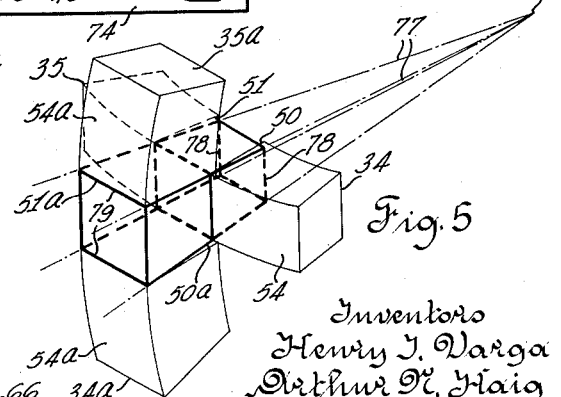
FIG. 5 is a diagrammatic showing of parts of the collimator of this invention in relation to a collimated beam of radiation.

FIG. 5 shows the relationship of the four collimating blocks 34, 34a; 35, 35a to a pyramid shaped beam that is indicated by the dot and dash lines 77 that diverge from the focus 23. The rectangular cross section of the beam is indicated progressively in part by lines 78, 79. The outermost rays within the desired horizontal pattern are parallel to the aperture surfaces 50, 51 of the horizontal set and consequently do not encounter any of the radiation absorbing material. All of the rays outside of the horizontal pattern strike the inner surfaces 53 of one of the blocks 34, 35 and encounter all of the absorbing material. Consequently, the horizontal set cuts off the sides of the beam sharply; and there is no penumbra such as would be produced if the border of the beam entered or left a block 34 or 35 through one of the aperture surfaces 50 or 51 and thereby encountered only a partial amount of absorbing material. Similarly the vertical set 32 absorbs rays outside the vertical pattern of the pyramid and produces sharply defined upper and lower beam edges. Since the arcuate path on which the blocks move is centered at the focus 23 and since the aperture surfaces face at right angles to their direction along the path, the aperture surfaces for any position of the collimator lie on a radius from the focus and the aperture surfaces define a plane that includes the focus. Consequently, the beam is sharply defined not only for the position illustrated in FIG. 5, but for any setting of the aperture spacing.

Thus, it will be seen that the collimator very effectively meets the requirements presented by a betatron. Furthermore, it will be apparent to those skilled in the art that the collimator is not limited to use with a betatron and that the details of the single embodiment illustrated may be varied within the scope of the appended claims.

Having now particularly described and ascertained the nature of our said invention and the manner in which it is to be performed, we declare that what we claim is:

1. A collimator comprising a plurality of relatively movable radiation absorbing blocks arranged in sets of two blocks to form an aperture for giving a beam of radiation a selected pyramid shaped pattern with the apex of the pyramid at the focus of the beam, each of said blocks having a substantially flat surface facing a different side of the pyramid pattern and extending along the path of the beam sufficiently to satisfactorily absorb the radiation immediately outside the pyramid pattern and extending transverse to the path of the beam sufficiently for the portion of the beam absorbed outside each said surface to partially overlap the portion absorbed outside the surfaces of the blocks facing the two adjacent sides of the pyramid, means defining arcuate paths centered at the focus of the beam, and means for moving the two blocks in each of said sets along one of said arcuate paths to independently vary the spacing between opposite sides of the pyramid pattern, each of said surfaces being perpendicular to its direction along an arcuate path to maintain said surfaces parallel with the immediately adjacent sides of the pyramid pattern to avoid a penumbra in the selected pattern.

2. A collimator comprising a plurality of relatively movable radiation absorbing blocks arranged in sets of two blocks to form an aperture for giving a beam of radiation a pyramid shaped pattern with the apex of the pyramid at the focus of the beam, each of said blocks having a substantially flat surface facing a different side of the pyramid pattern and extending a sufficient distance along the path of the beam to satisfactorily absorb the radiation immediately outside the selected pattern and extending a predetermined distance transverse to the path of the beam, means for guiding the two blocks in each of said sets on a common arcuate path to independently vary the spacing between opposite sides of the pyramid pattern, said arcuate path being centered at the focus of the beam and each of said surfaces being perpendicular to its direction along said arcuate path to maintain said surfaces parallel with the immediately adjacent sides of the pyramid pattern, and means mounting said sets spaced along the beam with the portions of the beam absorbed outside said flat surfaces overlapping to form a closed figure.

3. A collimator comprising four movable radiation absorbing blocks arranged to form a rectangular aperture for giving a beam of radiation a sharply defined pyramid shaped pattern with the apex of the pyramid at the focus of the beam, each of said blocks having a substantially flat surface facing a different side of the pyramid pattern, said surfaces extending along the path of the beam sufficiently to satisfactorily absorb the radiation immediately outside the pyramid pattern and extending transverse to the path of the beam sufficiently to form a closed figure, and means for guiding said blocks along arcuate paths to vary the spacing between the opposite sides of the pyramid pattern, said arcuate paths being centered at the focus of the beam and each of said surfaces being perpendicular to its direction along an arcuate path to maintain each of said surfaces parallel with its corresponding side of the pyramid pattern.

References Cited in the file of this patent

UNITED STATES PATENTS

| | | |
|---|---|---|
| 2,492,031 | Blatz et al. | Dec. 20, 1949 |
| 2,542,196 | Haupt | Feb. 20, 1951 |
| 2,844,736 | Johns et al. | July 22, 1958 |
| 2,894,144 | Barrett | July 7, 1959 |
| 2,904,692 | Gscheidlen | Sept. 15, 1959 |